though there was such advantage that the polymerization loss was slight that the coloring was overlooked.

United States Patent Office 3,708,524
Patented Jan. 2, 1973

3,708,524
PROCESS FOR PRODUCING HYDROXY-
ALKYLACRYLATES OR HYDROXYALKYL-
METHACRYLATES
Masayuki Murayama, Niigata, and Koichi Abe, Niitsu, Japan, assignors to Japan Gas-Chemical Company, Inc., Tokyo, Japan
No Drawing. Filed June 5, 1970, Ser. No. 43,930
Int. Cl. C07c 69/54
U.S. Cl. 260—486 B 7 Claims

ABSTRACT OF THE DISCLOSURE

Process for the preparation of hydroxyalkylacrylates or hydroxyalkylmethacrylates, the improvement which is the use of trivalent iron compounds as catalysts.

---

The present invention relates to a process for producing hydroxyalkylacrylates or hydroxyalkylmethacrylates. More particularly, the invention pertains to an improvement in a process for producing hydroxyalkylacrylates or hydroxyalkylmethacrylates in the presence of trivalent iron compounds as catalysts.

For the synthesis of hydroxyalkylacrylates or hydroxyalkylmethacrylates by reaction of alkylene oxides with acrylic or methacrylic acid, basic and tetraalkylammonium salt type catalysts are effective, and there have been known, for example, pyridine (U.S. Pat. 2,484,487), potassium methacrylate (U.S. Pat. 3,314,988) and tetraalkylammonium salts (U.S. Pat. 3,059,024). On the other hand, ferric chloride (British Pat. 871,767) and aluminum chloride (U.S. Pat. 3,150,167) have also been known to be effective as catalysts therefor.

We previously found that a trivalent iron compound had the most promising catalyst action, and that the reaction rate became extremely high when such a compound as a main catalyst is used in combination with a co-catalyst of at least one member of the group consisting of copper, copper compounds, mercury, mercury compounds, chromium, chromium compounds and iodine (Japanese patent publication No. 18,890/1968). Thus, a process for producing hydroxyalkylacrylates or hydroxyalkylmethacrylates by reaction of alkylene oxides with acrylic or methacrylic acid, in which a trivalent iron compound is used as a catalyst, is markedly excellent. This process, however, has several drawbacks.

One of the drawbacks is concerned with the properties of polymers obtained from the end products of the said process. The end products of the above-mentioned process, i.e. hydroxyalkylacrylates or hydroxyalkylmethacrylates, are used, in most cases, as thermosetting acrylic paints by copolymerizing them with other monomers in an organic solvent. However, it has been found that acrylic paints, which have been prepared by use of hydroxyalkylacrylates or hydroxyalkylmethacrylates synthesized in the presence of a trivalent iron compound catalyst, sometimes suffer from formation of slight turbidity or from gelation.

The other drawback is concerned with coloration of the hydroxyalkylacrylate and hydroxyalkylmethacrylate end products. For the synthesis and/or distillation of such easily polymerizable materials as hydroxyalkylacrylates or hydroxyalkylmethacrylates, there is used ordinarily a free radical polymerization inhibitor. Since hydroquinone is extremely prominent in free radical polymerization-inhibiting effect and is obtainable at low cost, the use thereof, whenever possible, is commercially advantageous. However, in the case where a trivalent iron compound catalyst was used in combination with hydroquinone as a free radical polymerization inhibitor, yellowing of the end products was unavoidable, though there was such Noticing the excellent catalyst ability possessed by trivalent iron compounds, we further advanced our studies to clarify the causes for the aforesaid drawbacks and to find a process for overcoming the said drawbacks, and then have accomplished the present invention based on the following finding.

That is, as to the first drawback concerned with the properties of polymers, it has been clarified that the formation of turbidity and the gelation is closely connected with the amount of the alkylenediacrylate or alkylenedimethacrylate (hereinafter abbreviated to "diester") which is present in the product, and it has been found that the amount of the diester in the product is desirably less than 0.5 wt. percent, and if the amount is more than 1 wt. percent, there is brought about a cause for the formation of turbidity or the gelation.

According to our studies, the formation of the diester is observed in the following two cases:

The first case is such that if, in the reaction of an alkylene oxide with acrylic or methacrylic acid in the presence of a trivalent iron compound catalyst, the alkylene oxide is present in excess at the time when the acid has completely been consumed, 2 mols of the resulting hydroxyalkylacrylate or hydroxyalkylmethacrylate converts to an alkyleneglycol and a diester. (This may be represented, in the case of hydroxyethylacrylate for example, by the equation $2CH_2=CHCOOCH_2CH_2OH \rightarrow CH_2$ 
$=CHCOOCH_2CH_2OCOCH=CH_2 + HOCH_2CH_2OH.)$ The second case is such that regardless of the presence or absence of the catalyst and the acid, 2 mols of the resulting hydroxyalkylacrylate or hydroxyalkylmethacrylate converts at an elevated temperature to an alkyleneglycol and a diester.

As to the second drawback concerning coloration of the end product, it has been found that the coloration is ascribable chiefly to the fact that hydroquinone is oxidized to benzoquinone by action of the trivalent iron compound used as the catalyst and benzoquinone is sublimed at the time of distillation of the end product.

As the result of ardent studies on the above-mentioned points, we have found that, surprisingly, all the drawbacks encountered in the case where trivalent iron compounds were used as catalysts can be overcome by adding a divalent tin compound to the reaction system at the terminal stage of the reaction. By "terminal stage of the reaction" and "at a step for termination of the reaction" as used herein is meant: The terminal stage of the reaction does not always mean the stage at which the conversion of acrylic or methacrylic acid into hydroxyalkylacrylate or hydroxyalkylmethacrylate is complete. Rather, by that expression is meant any stage at which the reaction is desired to be terminated. The stage at which the reaction is to be terminated will be determined depending on the situation. The desired stage will depend upon the desired composition of the final product. For example, if a product which is a hydroxyalkylacrylate-acrylic acid mixture is desired for use in acrylic paint compositions, the conversion reaction will be terminated at a relatively early stage. That is, the present invention has made it possible to inhibit the formation of diester by such a simple operation that a divalent tin compound is added to terminate the reaction, and to obtain an end product free from coloration even in the case where hydroquinone is used as a free radical polymerization inhibitor. Thus, the invention provides a process for producing high purity hydroxyalkylacrylates or hydroxyalkylmethacrylates with marked commercial advantages.

The present invention further involves such modes of practice as mentioned below. That is, in the purification of hydroxyalkylacrylates or hydroxyalkylmethacrylates obtained by any process wherein the reaction is terminated under such selected conditions as not to bring about the increase in amount of diester, if a divalent tin compound is added during the stage of from the termination of the reaction to the distillation of the product, it is possible to obtain an end product free from coloration even when hydroquinone has been used as a free radical polymerization inhibitor. The above-mentioned conditions which bring about no increase in amount of diester include such modes as mentioned below: a mode in which is adopted such a cooling means that prior to the time of reaction termination anticipated from the concentration of unreacted acid in the reaction system, the reaction system is cooled by a suitable procedure so that the unreacted acid reaches a predetermined concentration at the same time when the catalyst is substantially deprived of its catalyst activity owing to the lowering of temperature, and the injection of alkylene oxide is discontinued at this stage; a mode according to the above-mentioned mode, in which the time of injection of alkylene oxide is suitably selected in connection with the amount of alkylene oxide present in the system; and a mode in which the forced cooling, the discontinuation of injection of alkylene oxide and the degasification of alkylene oxide present in the system are carried out in parallel to one another. These modes can be optionally selected so that the alkylene oxide may not be present in excess at the time when the amount of unreacted acid is decreased.

In case the reaction has been terminated without the use of such divalent tin compound, no catalyst activity is displayed owing to the lowering in temperature of the reaction system or no unreacted alkylene oxide is present in the reaction system, even if the concentration of unreacted acid at the anticipated reaction terminal is close to such a low concentration as to be sufficient to increase rapidly the amount of diester formed. It is therefore possible with a little troublesome operation to select such reaction termination conditions as not to bring about the increase in amount of diester. However, in case the distillation has been effected without the addition of a divalent tin compound, not only the product is colored in the case where hydroquinone has been used as a free radical polymerization inhibitor, but also various undesirable results are brought about if a trivalent iron compound is present at the time when the product is heated to distillation temperature during the purification thereof. Even in such a case, however, the distillation can be effected successfully if a divalent tin compound is added at the time of distillation.

Thus, when a divalent tin compound is added at the terminal stage of reaction or at the time of distillation of the product, i.e. during the stage of from termination of the reaction to the distillation step, surprisingly marked effects can be attained without bringing about any detrimental effect due to addition of said divalent tin compound. The reason therefor has not sufficiently been clarified yet, but is considered such that if a divalent tin compound is added at the terminal stage of the reaction, the trivalent iron compound is deprived of its catalyst activity by reduction with the divalent tin compound to make it possible to inhibit the formation of diester which is quickly increased in amount at the time when the amount of unreacted acid has been decreased at the terminal stage of the reaction. Further, the reason why the addition of a divalent tin compound at the terminal stage of the reaction or at the time of distillation makes it possible to prevent the product from coloration, even in the case where hydroquinone has been used as a free radical polymerization inhibitor, is considered such that not only the trivalent iron compound is reduced with the divalent tin compound to prevent the formation of benzoquinone, which is formed chiefly by oxidation of the trivalent iron compound, but also the benzoquinone, which has already been formed, is reduced to hydroquinone by action of the divalent tin compound.

A preferred embodiment of the present invention is as follows:

An alkylene oxide and acrylic or methacrylic acid are reacted by each other using a trivalent iron compound as a catalyst either in the presence or absence of a co-catalyst. When the amount of unreacted acid in the reaction system has become 0.1 to 3.0 wt. percent, preferably 0.3 to 0.8 wt. percent, a divalent tin compound is added to the reaction system. The reaction according to this embodiment is high in reaction rate and hence is not required to be effected under pressure. The reaction proceeds immediately when the catalyst is dissolved in acrylic or methacrylic acid, the resulting solution is maintained at 50° to 90° C. with stirring and then the alkylene oxide in the form of liquid or gas is injected into the solution under normal pressure. It is advantageous to carry out the reaction at a temperature as low as possible, because the amount of by-produced diester is less. However, the lower the temperature, the lower the reaction rate, so that a temperature of above 50° C. is preferable. The adoption of a temperture above 90° C. is not desirable, because the by-production of diester is brought about. If the amount of unreacted acid becomes less than 0.1 wt. percent, the formation of diester quickly takes place. Accordingly, when the amount of unreacted acid has become 0.1 to 3 wt. percent, preferably 0.3 to 0.8 wt. percent, the divalent tin compound is added in an amount of more than 1.1 times, preferably 1.5 to 3.5 times, the amount, in terms of the gram atom of the metal, of the trivalent iron compound, whereby the object of the present invention can sufficiently be accomplished. In case the divalent tin compound is added at the terminal stage of the reaction where the amount of unreacted acid becomes 0.1 to 3 wt. percent, preferably 0.3 to 0.8 wt. percent, as mentioned above, it is possible to obtain a product of the highest purity which is less not only in diester content but also in unreacted acrylic or methacrylic acid content. However, if a product containing a more or less amount of unreacted acid is desired to be obtained, the reaction is terminated by adding the divalent tin compound at the time when the amount of unreacted acid in the reaction system is more than 3 wt. percent, whereby it is possible to obtain a product which contains a desired amount of acrylic or methacrylic acid and which is less in content of diester.

Another preferred embodiment of the present invention is such that the reaction is terminated by cooling the reaction liquid and degasifying the alkylene oxide, as mentioned previously, and then the divalent tin compound is added at a step prior to distillation of the product. In this case, suitable cooling conditions should necessarily be selected so that the amount of unreacted acid in the reaction system does not become less than 0.1 wt. percent. Further, the alkylene oxide should be injected carefully, and after discontinuation of the injection of the alkylene oxide dissolved in the system should be degasified. According to this embodiment also, the amount of the divalent tin compound to be used is more than 1.1 times, preferably 1.5 to 3.5 times, the amount, in terms of the gram atom of the metal, of the trivalent iron compound, whereby the object of the present invention can sufficiently be accomplished.

The time of addition of the divalent tin compound can be optionally selected depending on the desired composition of the end product or the mode of purification thereof (e.g. whether the reaction liquid is distilled immediately after the reaction or optionally after once cooling thereof).

As the alkylene oxide, there is used ethylene oxide, propylene oxide or butylene oxide. The amount of the alkylene oxide used is 1.0 to 1.3 mols per mol of acrylic or methacrylic acid. The trivalent iron compound, which is the catalyst, is preferably used in any of such forms as halides, thiocyanates, nitrates, sulfates and organic acid salts. Even in the case where the trivalent iron compound as a main catalyst is used in combination with a co-catalyst of at least one member of the group consisting of copper, copper compounds, mercury, mercury compounds, chromium, chromium compounds and iodine, the effect attained by addition of the divalent tin compound does not change at all. On the contrary, the addition of the co-catalyst gives such advantages that the reaction rate is promoted and the reaction proceeds at a low tempearture and in a short period of time, with the result that the formation of diester is inhibited.

The divalent tin compound employed in the present invention may be any of those which are soluble in the reaction liquid, but the use of stannous chloride or stannous bromide is preferred. The divalent tin compounds may be added in any of such forms as anhydrides, hydrates, solids and solutions. During the reaction, there may be used a common free radical polymerization inhibitor such as, for example, tannic acid, phenothiazine, diphenylamine or N,N'-di-2-naphthyl-p-phenylenediamine. However, a phenol type free radical polymerization inhibitor, e.g. hydroquinone and derivatives thereof as p-methoxyphenol, 2,5 - di-t-butylhydroquinone or 3,5-di-t-butyl-4-hydroxytoluene, is particularly effective.

Explanation is made below with respect to a comparison between the case where the divalent tin compound was used and the case where no such compound was used.

Table 1 shows a comparison between the reaction liquid of Example 2 (obtained by terminating the reaction by addition of stannous chloride) and a reaction liquid (25° C.) containing 0.4 wt. percent of unreacted methacrylic acid which was prepared in such a manner that reaction was effected under entirely the same conditions as in Example 2 and, when the amount of unreacted methacrylic acid had become 3 wt. percent, the injection of ethylene oxide was discontinued, and when the amount of un-reacted acid had become 0.8 wt. percent, the heating was discontinued, followed by forced cooling for 1 hour.

minutes, a considerable amount of diester is formed. Moreover, when a commerical scale apparatus is used, the immediate termination of reaction is extremely difficult. It is therefore quite effective to use the divalent tin compound for the termination of reaction. Further, Example 2 greatly differs from Comparative Example in hue of the product. That is, in case the divalent tin compound has been used for the termination of reaction, hydroquinone which is extremely useful from the industrial standpoint as a free radical polymerization inhibitor is effectively usable without any coloration of the product. However, hydroquinone cannot be used in the case where the divalent tin compound has not been used and thus the coloration of the product comes into question.

The present invention is illustrated in further detail below with reference to examples.

EXAMPLE 1

A mixture comprising 360 g. of acrylic acid, 0.3 g. of hydroquinone and 4 g. of ferric chloride as a catalyst was charged in a reactor, and was heated to 80° C. after flushing the reactor with nitrogen gas. Then, ethylene oxide in the form of gas was injected at a rate of 40 g./hr. When the reaction was continued for 6 hours, the amount of unreacted acrylic acid became 0.3 wt. percent, so that 10 g. of stannous chloride were immediately added to terminate the reaction. The resulting crude hydroxyethylacrylate was subjected to simple distillation under 4 mm. Hg abs. to obtain 540 g. of a product with a hue of APHA 3 which was composed of 98 wt. percent hydroxyethylacrylate, 0.3 wt. percent of acrylic acid and 0.3 wt. percent of ethylene diacrylate.

EXAMPLE 2

A mixture comprising 430 g. of methacrylic acid, 1 g. of hydroquinone, 0.8 g. of ferric chloride as a catalyst and 1.5 g. of sodium bichromate was charged in a reactor, and heated to 80° C. after flushing the reactor with nitrogen gas. Then, ethylene oxide in the form of liquid was injected at a rate of 180 g./hr. When the reaction was continued for 1 hour and 20 minutes, the

TABLE 1

| Reaction termination procedure | Reaction yield (mol percent) | Distillation yield (wt. percent) | Composition of product (wt. percent) | | | Hue of product (APHA) |
| --- | --- | --- | --- | --- | --- | --- |
| | | | HEMA | MAA | EDMA | |
| Example 2 ............ Addition of stannous chloride ............................. | 97.0 | 93.5 | 98 | 0.4 | 0.2 | 2 |
| Comparative example..... Quick cooling without addition of stannous chloride..... | 97.0 | 92.0 | 97 | 0.4 | 0.4 | >100 |

NOTE.—

Reaction yield = $\frac{\text{Mol of produced hydroxyethylmethacrylate}}{\text{Mol of fed methacrylic acid}} \times 100$ Distillation yield = $\frac{\text{Weight of distilled hydroxyethylmethacrylate}}{\text{Weight of fed crude hydroxyethylmethacrylate}} \times 100$ HEMA = Hydroxyethylmethacrylate.
MAA = Methacrylic acid.
EDMA = Ethylene dimethacrylate.

In Comparative Example, the time of discontinuation of ethylene oxide injection and the cooling conditions were suitably selected so that the final composition of the reaction liquid became identical with that of the reaction liquid of Example 2. Accordingly, Example 2 and Comparative Example do not differ from each other in reaction yield and reaction liquid composition.

As to Example 2, such fact as mentioned below has been confirmed according to other experiments carried out by us. That is, if, in Example 2, the reaction system is not cooled quickly but is maintained at the reaction temperature when the amount of unreacted methacrylic acid has become 0.4 wt. percent, the amount of diester increases to 2 to 5 wt. percent. Further, even if the reaction system is quickly cooled and lowered in temperature when the amount of unreacted methacrylic acid has become 0.4 wt. percent, the reaction proceeds in a period of several minutes during which the reaction system is maintained at a relatively high temperature, and the amount of unreacted methacrylic acid becomes 0.1 wt. percent or less, with the result that the amount of diester increases to about 1 wt. percent. Thus, even if the reaction time is in excess of such a short period as several amount of unreacted methacrylic acid became 0.4 wt. percent, and 2 g. of stannous chloride were immediately added to terminate the reaction. The resulting crude hydroxyethylmethacrylate was subjected to simple distillation under 4 mm. Hg abs. to obtain 611 g. of a product with a hue of APHA 2 which was composed of 98 wt. percent of hydroxyethylmethacrylate, 0.4 wt. percent of methacrylic acid and 0.3 wt. percent of ethylene dimethacrylate.

EXAMPLE 3

A mixture comprising 360 g. of acrylic acid, 1.5 g. of 2,5-di-t-butyl hydroquinone and 5 g. of ferric nitrate as a catalyst was charged in a reactor and heated to 85° C. after flushing the reactor with nitrogen gas. Then, propylene oxide in the form of gas was injected at a rate of 43 g./hr. When the reaction was continued for 7 hours, the amount of unreacted acrylic acid became 0.8 wt. percent, and 13 g. of stannous bromide were immediately introduced to terminate the reaction. The resulting crude hydroxypropylacrylate was subjected to simple distillation under 5 mm. Hg abs., to obtain 608 g. of a product with a hue of APHA 2 which was composed of 98 wt. percent of hydroxypropylacrylate, 0.8 wt. percent of acrylic acid and 0.1 wt. percent of propylene diacrylate.

EXAMPLE 4

A mixture comprising 430 g. of methacrylic acid, 0.8 g. of p-methoxyphenol and a catalyst composed of 1 g. of ferric sulfate and 1 g. of cupric chloride were charged in a reactor and heated to 75° C. after flushing the reactor with nitrogen gas. Then, propylene oxide in the form of liquid was injected at a rate of 150 g./hr. When the reaction was continued for 2 hours, the amount of unreacted methacrylic acid became 0.5 wt. percent, and 3 g. of stannous chloride were immediately added to terminate the reaction. The resulting crude hydroxypropylmethacrylate was subjected to simple distillation under 4 mm. Hg abs. to obtain 670 g. of a product with a hue of APHA 3 which was composed of 98 wt. percent of hydroxypropylmethacrylate, 0.5 wt. percent of methacrylic acid and 0.1 wt. percent of propylene dimethacrylate.

EXAMPLE 5

A mixture comprising 360 g. of acrylic acid, 0.5 g. of hydroquinone and a catalyst composed of 1 g. of ferric bromide and 1 g. of chromic anhydride was charged in a reactor, and heated to 70° C. after flushing the reactor with nitrogen gas. Then, butylene oxide in the form of liquid was injected at a rate of 200 g./hr. When the reaction was continued for 2 hours, the amount of unreacted acrylic acid became 0.3 wt. percent, and 3 g. of stannous bromide were immediately added to terminate the reaction. The resulting crude hydroxybutylacrylate was subjected to simple distillation under 2 mm. Hg abs. to obtain 665 g. of a product with a hue of APHA 2 which was composed of 98 wt. percent of hydroxybutylacrylate, 0.3 wt. percent of acrylic acid and 0.1 wt. percent of butylene diacrylate.

EXAMPLES 6-20

A mixture comprising 430 g. of methacrylic acid, 1 g. of hydroquinone and a catalyst system composed of $5 \times 10^{-3}$ mols of the main catalyst and $5 \times 10^{-3}$ mols of the co-catalyst, which are shown in Table 2, was reacted with ethylene oxide in the same manner and under the same conditions as in Example 2 to obtain the results set forth in Table 2. Each reaction was continued for 1.5 to 2.5 hours and, when the amount of unreacted methacrylic acid had become 0.3 to 0.5 wt. percent, stannous chloride was added to terminate the reaction. The amount of stannous chloride added was 3.0 times, in terms of the gram atom of the metal, the amount of the trivalent iron compound used.

containing 0.3 wt. percent of unreacted acrylic acid which was similar to that of Example 1. To this reaction liquid were added 10 g. of stannous chloride, and the resultant was subjected to distillation in the same manner as in Example 1 to obtain the same results as in Example 1. The addition of the said tin compound was effected at a step after the cooling and before the distillation; the same was the case with the examples shown below.

EXAMPLE 22

In Example 2, the injection of ethylene oxide was discontinued when the amount of unreacted methacrylic acid had become 1 wt. percent. At the same time, forced cooling was effected for 30 minutes to obtain a reaction liquid (25° C.) containing 0.4 wt. percent of unreacted methacrylic acid which was similar to that of Example 2. To this reaction liquid were added 2 g. of stannous chloride, and the resultant was subjected to distillation in the same manner as in Example 2 to obtain the same results as in Example 2.

EXAMPLE 23

In Example 3, the heating was discontinued when the amount of unreacted acrylic acid had become 5 wt. percent. Subsequently, forced cooling was effected and, after 1 hour, the injection of propylene oxide was discontinued to obtain a reaction liquid (23° C.) containing 0.8 wt. percent of unreacted acrylic acid which was similar to that of Example 3. To this reaction liquid were added 13 g. of stannous bromide, and the resultant was subjected to distillation in the same manner as in Example 3 to obtain the same results as in Example 3.

EXAMPLE 24

In Example 4, the injection of propylene oxide was discontinued when the amount of unreacted methacrylic acid had become 0.7 wt. percent. At the same time, forced cooling was effected for 30 minutes while carrying out the degasification of the propylene oxide, which had been dissolved in the system, to obtain a reaction liquid (30° C.) containing 0.5 wt. percent of unreacted methacrylic acid which was similar to that of Example 4. To this reaction liquid were added 3 g. of stannous chloride, and the resultant was subjected to distillation in the same manner as in Example 4 to obtain the same results as in Example 4.

EXAMPLE 25

In Example 5, the injection of butylene oxide was discontinued when the amount of unreacted acrylic acid had become 0.8 wt. percent. At the same time, forced cooling was effected for 40 minutes to obtain a reaction liquid (18° C.) containing 0.3 wt. percent of unreacted acrylic acid which was similar to that of Example 5. To this reaction liquid were added 3 g. of stannous bromide, and the resultant was subjected to distillation in the same manner as in Example 5 to obtain the same results as in Example 5.

TABLE 2

| Example number | Main catalyst ($5 \times 10^{-3}$ mol) | Co-catalyst ($5 \times 10^{-3}$ mol) | Reaction yield (mol percent) | Distillation yield (wt. percent) | Composition of product (wt. percent) | | | Hue of product (APHA) |
|---|---|---|---|---|---|---|---|---|
| | | | | | HEMA | MAA | EDMA | |
| 6 | Ferric bromide | Cupric nitrate | 98.0 | 93.5 | 98 | 0.3 | 0.3 | 2 |
| 7 | Basic ferric acetate | Basic cupric carbonate | 97.0 | 94.0 | 98 | 0.5 | 0.3 | 2 |
| 8 | Ferric nitrate | Mercuric cyanide | 96.5 | 92.0 | 98 | 0.4 | 0.3 | 0 |
| 9 | Ferric sulfate | Mercurous chloride | 96.0 | 92.0 | 98 | 0.5 | 0.3 | 2 |
| 10 | Iron thiocyanate | Mercuric acetate | 96.5 | 93.0 | 98 | 0.4 | 0.3 | 4 |
| 11 | Ferric chloride | Chromic bromide | 98.5 | 93.5 | 98 | 0.3 | 0.4 | 0 |
| 12 | do | Chromic hydroxide | 97.0 | 93.5 | 98 | 0.3 | 0.3 | 0 |
| 13 | Ferric iodide | Chromic nitrate | 98.5 | 92.0 | 98 | 0.3 | 0.4 | 5 |
| 14 | do | Chromium naphthenate | 98.0 | 91.0 | 98 | 0.4 | 0.4 | 3 |
| 15 | Basic ferric acetate | Chromic acetate | 97.5 | 94.0 | 98 | 0.4 | 0.3 | 0 |
| 16 | do | Chromic phosphate | 96.5 | 92.0 | 98 | 0.5 | 0.4 | 0 |
| 17 | Ferric nitrate | Ammonium chromate | 98.0 | 93.0 | 98 | 0.3 | 0.3 | 2 |
| 18 | do | Sodium bichromate | 98.0 | 92.5 | 98 | 0.3 | 0.3 | 0 |
| 19 | Ferric sulfate | Ammonium bichromate | 97.5 | 92.0 | 98 | 0.4 | 0.3 | 0 |
| 20 | do | Cuprous iodide | 97.0 | 90.5 | 98 | 0.4 | 0.4 | 2 |

EXAMPLE 21

In Example 1, the injection of ethylene oxide was discontinued when the amount of unreacted acrylic acid had become 3 wt. percent, and the heating was discontinued when the amount of unreacted acid had become 1 wt. percent. At the same time, forced cooling was carried out for 1 hour to prepare a reaction liquid (20° C.)

EXAMPLES 26–40

Examples 26–40 correspond to Examples 6–20, respectively.

In each of Examples 6–20, the injection of ethylene oxide was discontinued when the amount of unreacted methacrylic acid had become 0.8 to 1.2 wt. percent. At the same time, forced cooling was effected for 30 minutes to 1 hour to obtain a reaction liquid (room temperature) containing 0.3 to 0.5 wt. percent of unreacted methacrylic acid which was similar to that of corresponding example. To this reaction liquid was added stannous chloride in an amount of 3.0 times, in terms of the gram atom of the metal, the amount of the trivalent iron compound, and the resultant was subjected to distillation in the same manner as in each of Examples 6–20 to obtain the same results as in corresponding example.

What we claim is:

1. In a process for producing hydroxyalkylacrylates or hydroxyalkylmethacrylates which comprises reacting acrylic or methacrylic acid with an alkylene oxide having 2 to 4 carbon atoms in the presence of at least one trivalent iron compound in the forms as halides, thiocyanates, nitrates, sulfates and organic acid salts and a phenol type free radical polymerization inhibitor, the improvement for prevention of glycol diester formation and color formation comprising adding a divalent tin compound which is soluble in the reaction mixture in an amount of more than 1.1 moles per mole of said trivalent iron compound to the reaction system at a stage for completion of the reaction, to thereby render said trivalent iron compound catalytically inactive in the formation of the glycol diesters and/or colored compounds.

2. The improved process as claimed in claim 1, wherein said divalent tin compound is stannous chloride, stannous bromide or mixtures thereof.

3. The improved process as claimed in claim 1, wherein the addition of said divalent tin compound is effected at a stage when the amount of unreacted acrylic or methacrylic acid remaining in the reaction system is 3% to 0.1% by weight.

4. An improved process as claimed in claim 1, wherein at least one phenolic free radical polymerization inhibitor is used.

5. An improved process as claimed in claim 1, wherein the addition of said divalent tin compound is effected at a stage when the amount of unreacted acrylic or methacrylic acid remaining in the reaction system is more than 3% by weight.

6. In a process for producing hydroxyalkylacrylates or hydroxyalkylmethacrylates which comprises reacting acrylic or methacrylic acid with an alkylene oxide having 2 to 4 carbon atoms in the presence of a trivalent iron compound in the forms as halides, thiocyanates, nitrates, sulfates, and organic acid salts and a phenyl type free radical polymerization inhibitor, the improvement comprising adding a divalent tin compound which is soluble in the reaction mixture in an amount of more than 1.1 moles per mole of said trivalent iron compound to a reaction product at a stage which is after the completion of the reaction and before the distillation of the reaction product.

7. An improved process as claimed in claim 6, wherein at least one phenolic free radical polymerization inhibitor is used.

References Cited
FOREIGN PATENTS

| | | | |
|---|---|---|---|
| 871,767 | 6/1961 | Great Britain | 260—486 B |
| 1,147,938 | 5/1963 | Germany | 260—486 B |

LORRAINE A. WEINBERGER, Primary Examiner

P. J. KILLOS, Assistant Examiner

U.S. Cl. X.R.

260—635 R